United States Patent [19]

Fukushima et al.

[11] Patent Number: 4,791,829
[45] Date of Patent: Dec. 20, 1988

[54] FLYWHEEL WITH DYNAMIC DAMPER

[75] Inventors: Hirotaka Fukushima, Hirakata; Toru Hamada, Takatsuki, both of Japan

[73] Assignee: Kabushiki Kaisha Daikin Seisakusho, Osaka, Japan

[21] Appl. No.: 112,009

[22] Filed: Oct. 19, 1987

Related U.S. Application Data

[63] Continuation of Ser. No. 835,920, Mar. 4, 1986, abandoned.

[30] Foreign Application Priority Data

Mar. 19, 1985 [JP] Japan .................. 60-55023

[51] Int. Cl.$^4$ ............................................. F16F 15/10
[52] U.S. Cl. .......................................... 74/574; 74/572
[58] Field of Search ................. 74/572, 573 R, 574, 74/599

[56] References Cited

U.S. PATENT DOCUMENTS

| | | | |
|---|---|---|---|
| 3,861,828 | 1/1975 | Biermann et al. | 74/574 |
| 4,002,043 | 1/1977 | Yoshida | 74/572 |
| 4,267,805 | 5/1981 | Schmuck | 74/572 |
| 4,307,627 | 12/1981 | Sullivan | 74/574 |
| 4,364,594 | 12/1982 | Raquet | 74/574 |
| 4,370,900 | 2/1983 | Hartz | 74/574 |
| 4,378,865 | 4/1983 | McLean | 74/574 |
| 4,546,669 | 10/1985 | Fischer et al. | 74/579 E |
| 4,617,884 | 10/1986 | Allen et al. | 74/599 |

FOREIGN PATENT DOCUMENTS

| | | | |
|---|---|---|---|
| 2734769 | 2/1979 | Fed. Rep. of Germany | 74/574 |
| 2903715 | 8/1980 | Fed. Rep. of Germany | 74/574 |
| 14257 | 3/1983 | Japan | 74/574 |
| 14258 | 3/1983 | Japan | 74/574 |
| 379202 | 8/1964 | Switzerland | 74/574 |
| 423948 | 2/1935 | United Kingdom | 74/574 |

*Primary Examiner*—Richard E. Moore
*Assistant Examiner*—Vinh Luong
*Attorney, Agent, or Firm*—Armstrong, Nikaido, Marmelstein & Kubovcik

[57] ABSTRACT

A flywheel with a dynamic damper which has an elastic member having a rectangular cross sectional shape and made of an elastic material which can dampen all the vibrations transmitted from a crank shaft to the flywheel. The dynamic damper is fixed to an engine side face of the flywheel rigidly fastened to the engine crank shaft, and a weight having a mass corresponding to the mass of the flywheel is floatingly supported through the elastic member so as not to contact with the flywheel.

8 Claims, 4 Drawing Sheets

FLYWHEEL WITH DYNAMIC DAMPER

This application is a continuation of application Ser. No. 835,920 filed Mar. 4, 1986, now abandoned.

DETAILED DESCRIPTION OF THE INVENTION

1. Industrial Useful Field

This invention relates to a flywheel with a dynamic damper which damps vibrations transmitted from a crank shaft of an engine.

2. Prior Arts and Their Problem

Conventionally, prior art for damping vibrations transmitted from a crank shaft is done by equipping a dynamic damper to a flywheel. (Examined Japanese Utility Model Publication Nos. 58-14257 58-14258).

However, since in the prior art the dynamic damper is composed of an elastic disc made of metal plate and a weight ring, a problem arises since a vibration, which can be damped by the dynamic damper, is limited only to a bending vibration. As described later in details, the damping effect can not be expected for other vibrations such as a torsional vibration, a translational vibration etc. transmitted from the crank shaft.

3. Object of the Invention

An object of the present invention is to provide a flywheel with a dynamic damper which can effectively damp all the vibrations transmitted from a crank shaft.

COMPOSITION OF THE INVENTION

(1) Technical measure

This invention relates to a flywheel with a dynamic damper in which an elastic member having a shape and is made from a material which can damp all the vibrations transmitted from a crank shaft to the flywheel. The damper is fixed to an engine side face of the flywheel rigidly fastened to the engine crank shaft, and a weight having a specified mass is floatingly supported through the elastic member so as not to contact with the flywheel.

(2) Function

The elastic member is provided with the shape and material enabling the damping of all the vibrations transmitted from the crank shaft to the flywheel, so that the elastic member can damp the torsional vibration and the translational vibration in addition to the bending vibration.

BRIEF DESCRIPTION OF THE DRAWINGS

FIG. 5(a) shows a cross section along line I—I in FIG. 3 while

EMBODIMENT

Figure 1:
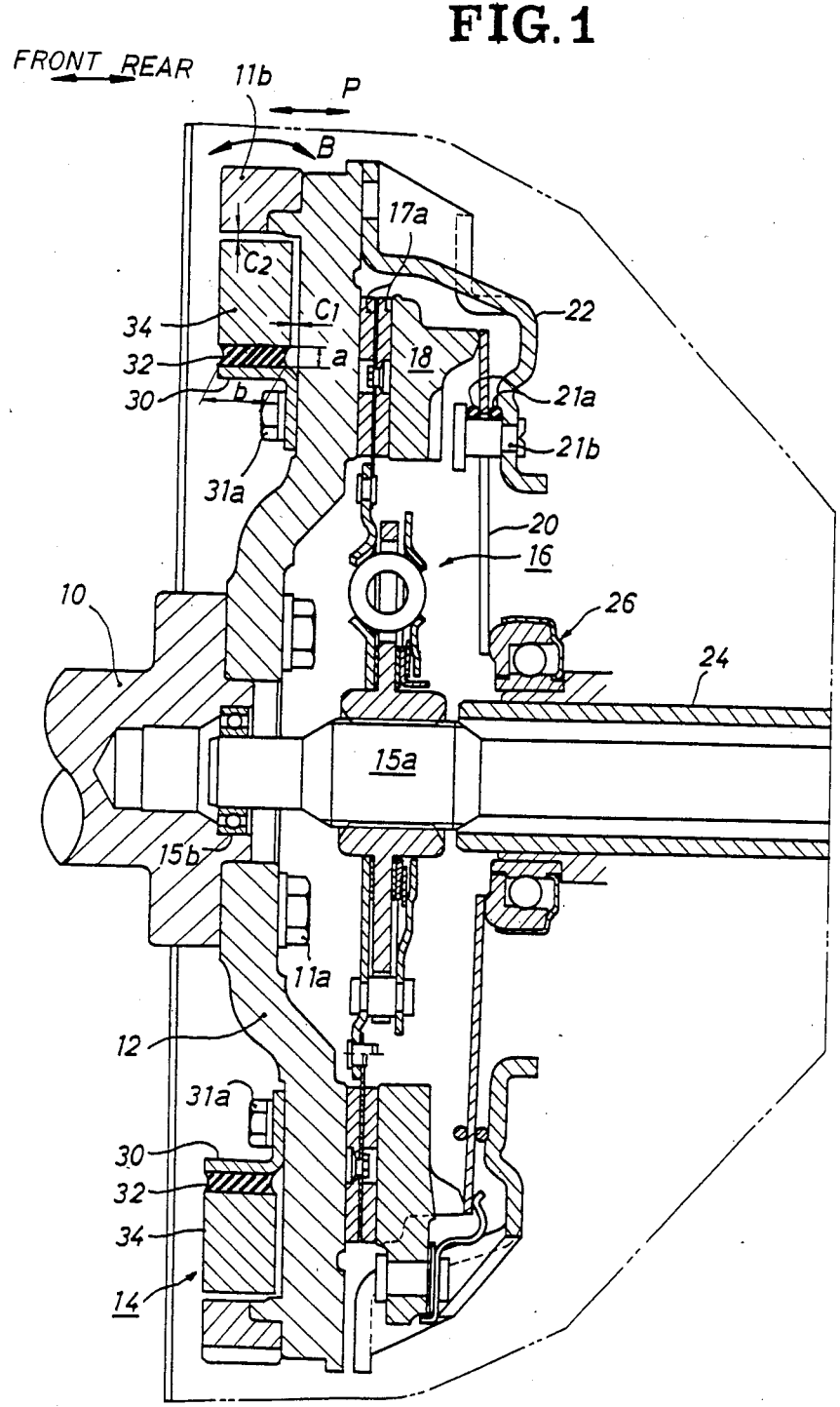
FIG. 1 is a vertical sectional view of a clutch applied with the present invention.
Figure 1A:
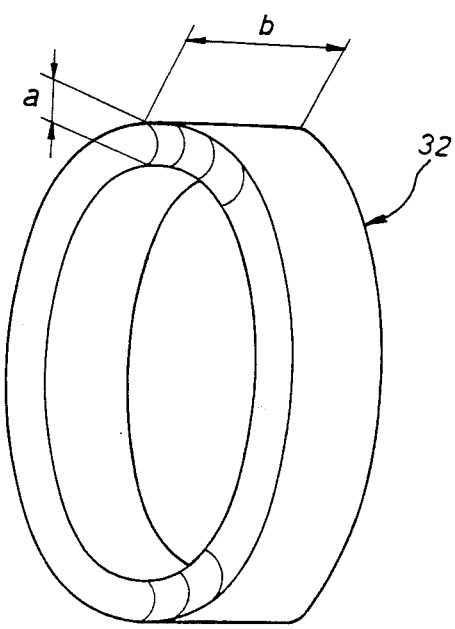

In FIG. 1 showing a clutch applied with the present invention, 10 is a crank shaft and a flywheel 12 is rigidly coupled by a bolt 11a to a rear end portion of the crank shaft 10. A dynamic damper 14 which will be described later in detail is provided on a front face, i.e. a face facing on an engine body, of the flywheel 12.

A clutch disc 16 is provided at a rear face side of the flywheel 12, and the clutch disc 16 spline fits onto an input shaft 15a of a speed changer at a rear stage of the clutch disc 16 so as to slide freely thereon. Further, a front end portion of the input shaft 15a is supported by a bearing 15b at a rear central part of the crank shaft 10.

A pressure plate 18 is installed so as to press a facing 17a of the clutch disc 16 against the flywheel 12, and the pressure plate 18 is pressed on by a diaphragm spring 20 which is supported by a clutch cover 22 through a wire ring 21a and a stud pin 21b. The clutch cover 22 covers the facing 17a, the pressure plate 18 etc. and is fixed to a rear face of the flywheel 12.

A release bearing 26 fits axially slidingly onto between a fixed cylindrical shaft 24 and an inner peripheral part of the diaphragm spring 20. The release bearing is to transmit a release force from a clutch pedal to the diaphragm spring 20. The fixed cylindrical shaft 24 is fixed to a clutch housing (not shown) of the speed changer.

The dynamic damper 14, forming a principal part of the present invention, is composed of a bracket 30, a rubber ring 32, a weight 34 etc. The bracket 30 has an approximately L-shape annular section and is continuous over the entire circumferential periphery of the flywheel 12. The bracket 30 is held to the flywheel by a bolt 31a.

An annular rubber ring 32 (elastic member) which will be described later in details is secured to a radially outer peripheral face of the bracket 30 by means of baking etc. Further, an annular weight 34, preset to a specified mass M corresponding to a mass of the flywheel 12, is stuck by baking to a radially outer peripheral face of the rubber ring 32. The weight 34 is floatingly supported, under a natural state, with a clearance C1 kept between it and a front face of the flywheel 12 and with a clearance C2 kept between it and a ring gear 11b of the flywheel 12.

A cross section of the rubber ring 32 is a rectangular shape having a width b of about three times as large as a thickness a. The ring is formed of a material having an appropriate elasticity, i.e. a rubber hardness, corresponding to the mass M of the weight 34. The ring is so formed as to absorb all the vibrations such as not only a bending vibration as shown by an arrow B transmitted from the crank shaft 10 to the flywheel 12, but a translational vibration of the flywheel 12 (a vibration such that the flywheel 12 carries out a parallel displacement along its axis) causing a resonance of the pressure plate 18 at the time of releasing the clutch as shown by an arrow P, a torsional vibration transmitted from the crank shaft 10 to the flywheel 12 in a direction vertical to the figure surface due to the torque fluctuation of the engine, and a 2nd mode vibration of the crank shaft 10 etc.

Figure 2:
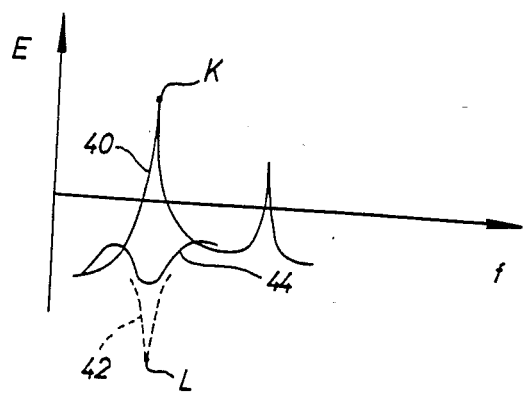
FIG. 2 is a graph showing a bending vibration characteristic of the flywheel of FIG. 1.

Further, the hardness of the rubber ring 32 is preset to such a value that a bending vibration characteristic of the dynamic damper 14 having the weight 34 of the mass M can exert a characteristic 42 wherein an inertance E of FIG. 2 generates a reverse resonance L (or zero-point) at a frequency f conforming to a resonance point K of a characteristic 40 of the flywheel 12.

Accordingly, a bending vibration characteristic for FIG. 1 wherein the flywheel 12 is coupled integrally with the dynamic damper becomes as a characteristic 44 of FIG. 2. Even in the vicinity of the conventional resonance point K, a value of the inertance E is minimized to control the bending vibration of the flywheel 12.

The inertance can be expressed as follows and its value shows a susceptibleness to vibration.

$$\text{Inertance } E = \theta X/F \quad (1)$$

where $\theta X$ is an acceleration and F is a force.

Function will be described hereunder. The bending vibration transmitted from the crank shaft 10 to the flywheel 12 is damped by the dynamic damper 14 to the characteristic 44 shown in FIG. 2. Thus the flywheel 12 rotates under a bending vibration controlled condition.

A synergetic effect of the shape and hardness of the rubber ring 32 can damp vibration other than the bending vibration, such as the translational vibration causing the flywheel 12 to vibrate in its axial direction due to an axial vibration of crank shaft 10 as shown by arrow P, the torsional vibration transmitted from the crank shaft 10 to the flywheel 12 in the direction vertical to the figure surface due to the torque fluctuation of the engine, and the 2nd mode vibration of the crank shaft 10 etc.

The translational vibration can be damped in such a way that the rubber ring 32 deforms to cause the parallel displacement of the weight 34 in the axial direction of the flywheel 12.

EFFECT OF THE INVENTION

As described above, in the flywheel with the dynamic damper of the present invention; the elastic member having a shape and a material which can dampen all the vibrations transmitted from the crank shaft to the flywheel, is fixed to the engine side face of the flywheel rigidly fastened to the engine crank shaft, and the weight having the specified mass is floatingly supported through the elastic member so as not to contact with the flywheel. The following effects become obtainable.

The bending vibration transmitted from the crank shaft 10 to the flywheel 12 is controlled to the characteristic 44 as show in FIG. 2 through means of the rubber ring 32 and the dynamic damper 14 having the weight 34, thus the flywheel 12 can be rotated with the bending vibration controlled. Since the rubber ring 32 is provided with not only the elasticity but the ability of damping the vibration, the vibration damping effect can be improved further.

Moreover, the synergetic effect of the shape and hardness of the rubber ring 32 can damp vibrations other than the bending vibration, such as the translational vibration transmitted from crankshaft 10 to the flywheel 12 flywheel 12 as shown by the arrow P, the torsional vibration transmitted from the crank shaft 10 to the flywheel 12 in the direction vertical to the figure surface due to the torque fluctuation of the engine, and the 2nd mode vibration of the crank shaft 10 etc., so that the flywheel 12 can also be isolated from the vibrations other than the bending vibration. The translational vibration can be dampen effectively in such a way that the rubber ring 32 deforms to cause the parallel displacement of the weight 34 in the axial direction of the flywheel 12.

Figure 3:
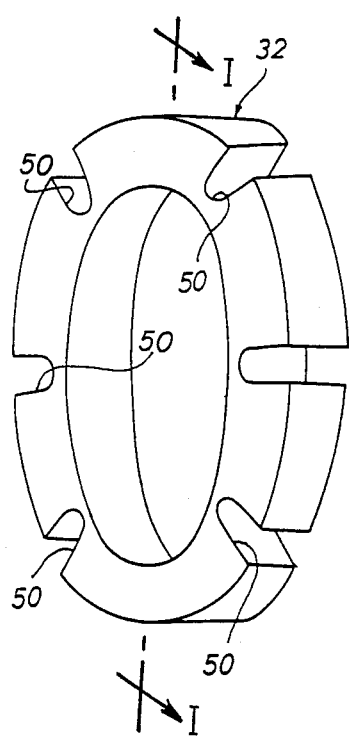
FIG. 3 and FIG. 4 are another embodiments of the elastic member respectively.
Figure 4:
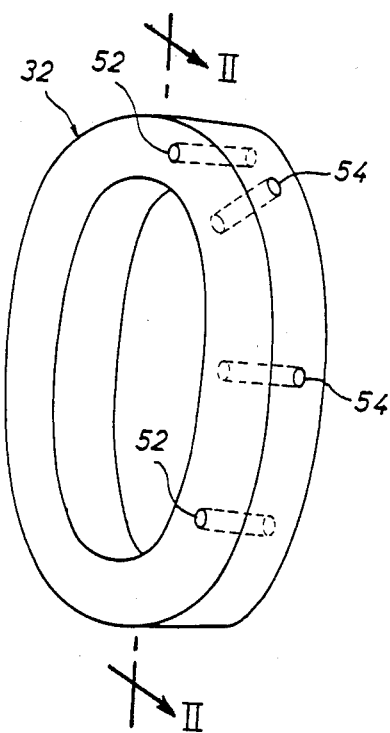
Figure 5A:
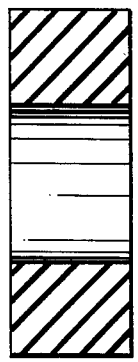
Figure 5B:
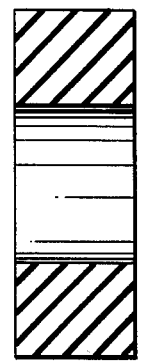
FIG. 5(b) shows a cross section along line II—II in FIG. 4.

The shape of the rubber ring 32 is not limited to the solid annular shape as shown in FIG. 1, but may be provided with notches 50 at circumferential plural places as shown in FIG. 3, for example, to improve the damping effect of torsional vibration. Further, as shown in FIG. 4, holes 52 may be made along the axis of the rubber ring 32 to adjust the damping characteristic for the translational vibration, or holes 54 radially penetrating the rubber ring 32 may be made.

Moreover, the elastic member is not limited to the annular consecutive member as represented by the rubber ring 32, but may be separately provided elastic member which are divided into circumferential plural places of the bracket 30.

Also, the material of the elastic member is not limited to the rubber, but other material having a proper elasticity may be selected therefor.

The rubber ring 32 is not necessarily secured to the inside of the weight, but may be secured to a radially outside of the weight 34.

What is claimed is

1. A flywheel in combination with a dynamic damper having an elastic member, said elastic member having a shape and being formed from a material which can dampen all the vibrations transmitted from a crank shaft to the flywheel, said dynamic damper is fixed to an engine side face of the flywheel which is rigidly fastened to the engine crank shaft, and an annular weight having a specified mass, said annular weight being floatingly supported, at an inner peripheral face, through the elastic member so as not to contact with the flywheel, the elastic member being a solid annular rubber ring which is continuous over the entire inner circumferential periphery of the weight.

2. A flywheel with a dynamic damper as set forth in claim 1, a cross section of the rubber ring is formed into a substantially rectangular shape having a width of about three times as large as a thickness, and a hardness of the rubber ring is preset to an appropriate hardness corresponding to the mass of the weight.

3. A flywheel with a dynamic damper as set forth in claim 2, in which an inner peripheral face of said rubber ring is stuck by baking to an outer peripheral face of a bracket formed into an approximately L-shape cross section and fastened to the engine side face of the flywheel, and an outer peripheral face of the rubber ring is stuck by baking to the inner peripheral face of the annular weight.

4. A flywheel with a dynamic damper as set forth in claim 1, wherein said flywheel has a ring gear installed in an outer peripheral part, and the weight is formed into an annular shape to be housed near an engine side face of the flywheel and with specified clearances kept therebetween at a radial inside of the ring gear, and a mass of the weight is preset to a value that will dampen vibrations of said flywheel.

5. A flywheel with a dynamic damper as set forth in claim 1, in which the elastic member is composed of an approximately annular rubber ring, and notches opening toward radially outsides of the rubber ring are provided at plural places of the rubber ring with circumferential equal spaces left therebetween on an outer peripheral part of said rubber ring.

6. A flywheel with a dynamic damper as set forth in claim 1, in which the elastic member is composed of an approximately annular rubber ring, and plural holes penetrating the rubber ring in its axial direction are made therein.

7. A flywheel with a dynamic damper as set forth in claim 1, in which the elastic member is composed of an approximately annular rubber ring, and plural holes penetraling the rubber ring in its radial direction are made therein.

8. A flywheel in combination with a dynamic damper in which an elastic member having a shape an being formed from a material which can dampen all the vibrations transmitted from a crank shaft to the flywheel, the dynamic damper is fixed to an engine side face of the flywheel which is rigidly fastened to the engine crank shaft, an annular weight having a specified mass, said annular weight being floatingly supported, at an inner peripheral face, thorough the elastic member so as not to contact the flywheel, said elastic member being a solid annular rubber ring which is continuous over an entire inner circumferential periphery of the weight, a cross section of the rubber ring is formed into a substantially rectangular shape having a width three times as large as a thickness, a hardness of the rubber ring is preset to an appropriate hardness correspondent to the mass of the weight, the rubber ring being secured by baking an inner peripheral face of said rubber ring to an outer peripheral face of a bracket formed into an approximately L-shape cross section and fastened to the engine side face of the flywheel, an outer peripheral face of the rubber ring is stuck by baking to the inner peripheral face of the annular weight, the flywheel has a ring gear installed on an outer peripheral part, the weight being formed into an annular shape to be housed near an engine side face of the flywheel and with specified clearances kept therebetween at a radial inside of the ring gear, and the mass of the weight being preset to a value that will dampen vibrations of said flywheel.

* * * * *